(12) United States Patent
Ooga et al.

(10) Patent No.: US 8,733,166 B2
(45) Date of Patent: May 27, 2014

(54) AIR FLOW MEASURING DEVICE

(75) Inventors: Takashi Ooga, Kariya (JP); Takashi Enomoto, Kasugai (JP)

(73) Assignee: Denso Corporation, Kariya (JP)

( * ) Notice: Subject to any disclaimer, the term of this patent is extended or adjusted under 35 U.S.C. 154(b) by 308 days.

(21) Appl. No.: 13/239,778

(22) Filed: Sep. 22, 2011

(65) Prior Publication Data
US 2012/0103084 A1 May 3, 2012

(30) Foreign Application Priority Data
Oct. 29, 2010 (JP) .................................. 2010-243947

(51) Int. Cl.
*G01F 1/68* (2006.01)
(52) U.S. Cl.
USPC ........................................................ 73/204.25
(58) Field of Classification Search
USPC .............................. 73/204.25, 204.26, 204.21
See application file for complete search history.

(56) References Cited

U.S. PATENT DOCUMENTS

| | | | |
|---|---|---|---|
| 6,938,473 B2 * | 9/2005 | Iwaki et al. ................. | 73/204.21 |
| 7,360,414 B2 * | 4/2008 | Konzelmann et al. ........ | 73/202.5 |
| 8,448,508 B2 * | 5/2013 | Schneider et al. ........... | 73/204.26 |
| 2003/0159501 A1 | 8/2003 | Renninger et al. | |
| 2012/0103086 A1 * | 5/2012 | Goka et al. ................. | 73/204.26 |

FOREIGN PATENT DOCUMENTS

| | | |
|---|---|---|
| JP | S63-67933 | 5/1988 |
| JP | 2010-85136 | 4/2010 |
| JP | 2010-204005 | 9/2010 |

OTHER PUBLICATIONS

Japanese Official Action dated Oct. 2, 2012 issued in corresponding Japanese Application No. 2010-243947, with English translation.

* cited by examiner

*Primary Examiner* — Jewel V Thompson
(74) *Attorney, Agent, or Firm* — Nixon & Vanderhye PC (57) ABSTRACT

An air flow measuring device includes a passage forming housing, a sensor housing, and a sensor part. An inner wall surface of the passage forming housing defines a measured passage. The passage forming housing includes a sensor attaching part. Measured air flows through the measured passage. The sensor housing is attached to the sensor attaching part. The sensor part is disposed on the sensor housing and measures a flow rate of the measured air flowing through the passage. The passage forming housing includes a guiding device for guiding the measured air, which flows along the inner wall surface of the passage forming housing on an upstream side of the sensor attaching part in a measured air flow direction, further toward a center of the passage than the inner wall surface of the passage forming housing on a downstream side of the sensor attaching part in the flow direction.

20 Claims, 7 Drawing Sheets

AIR FLOW MEASURING DEVICE

CROSS REFERENCE TO RELATED APPLICATION

This application is based on and incorporates herein by reference Japanese Patent Application No. 2010-243947 filed on Oct. 29, 2010.

BACKGROUND OF THE INVENTION

1. Field of the Invention

The present invention relates to an air flow measuring device and to a technology appropriately used for measuring the amount of air flow (intake air amount) suctioned to an engine (internal combustion which generates rotative power from burning of fuel).

2. Description of Related Art

First to third conventional technologies of an air flow measuring device will be described by using sectional views of a main feature illustrated in FIGS. 5 to 7C.

The first conventional technology will be described bellow. An air flow measuring device 101 illustrated in FIG. 5 includes a passage forming housing 103 that defines a measured passage (e.g., a tertiary air passage) 102 in which measured air (measuring object) flows, a sensor housing 105 attached to a sensor attaching part 104 which is formed on the passage forming housing 103, and a sensor part 106 which is disposed on an end of the sensor housing 105 and measures a flow rate of the measured air flowing through the measured passage 102 (see, e.g., Japanese Patent No. 4358517).

Figure 5:
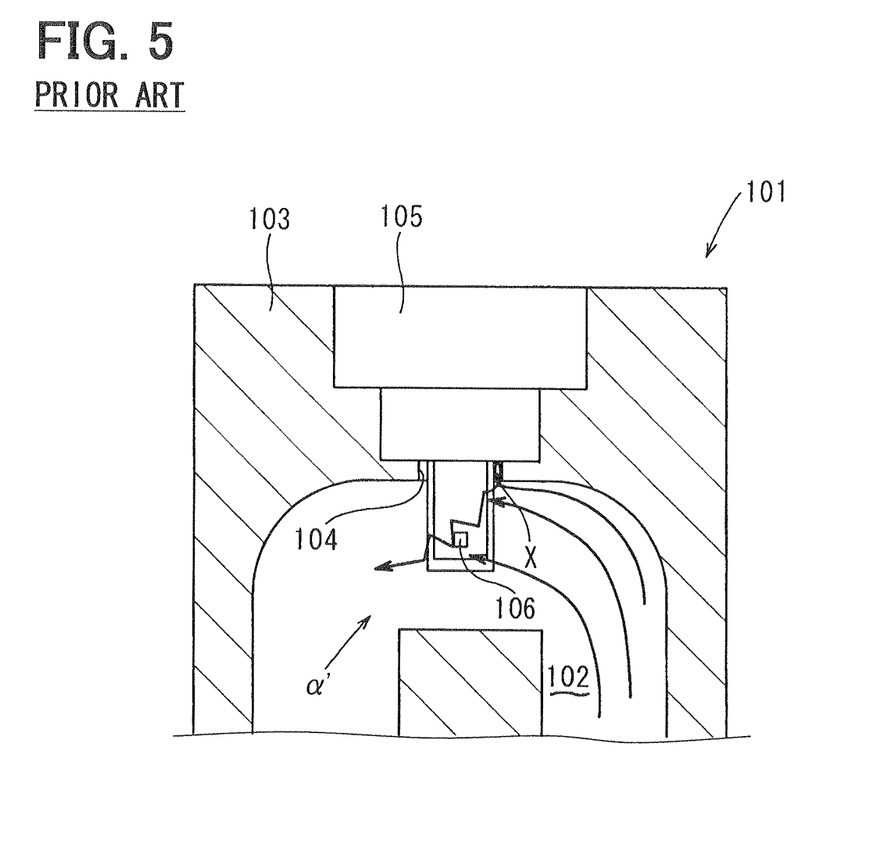
FIG. 5 is a general sectional view illustrating a main part of an air flow measuring device in accordance with a first conventional technology.

The sensor housing 105 is attached to the sensor attaching part 104 of the passage forming housing 103. Therefore, as shown in FIG. 5, it has possibility that a "gap X" is formed between the passage forming housing 103 and the sensor housing 105 because of dimensional variation of components and other reason.

In this way, if the "gap X" is formed between the passage forming housing 103 and the sensor housing 105, turbulence of air flow toward the sensor part 106 (see a devious arrow in FIG. 5) is generated, and causes variation of output from the sensor part 106. Depending on the shape (curve) of the measured air on the upstream side of the sensor part 106 in the measured air flow direction, influence of the "gap X" increases and the variation of the output from the sensor part 106 becomes great.

Figure 6A:
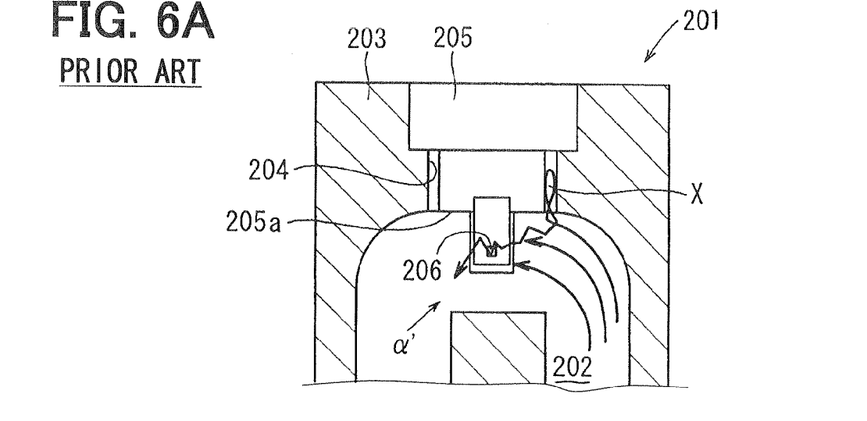
FIG. 6A is a general sectional view illustrating a main part of an air flow measuring device in accordance with a second conventional technology.
Figure 6B:
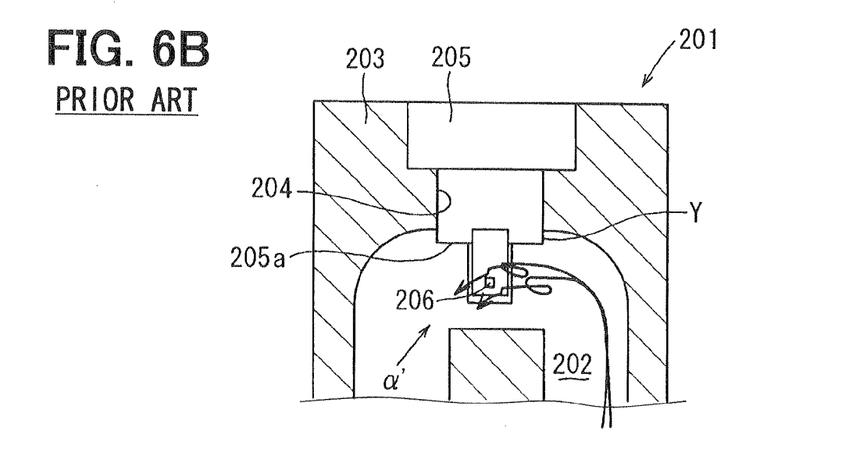
FIG. 6B is a general sectional view illustrating the main part of the air flow measuring device in accordance with the second conventional technology.
Figure 6C:
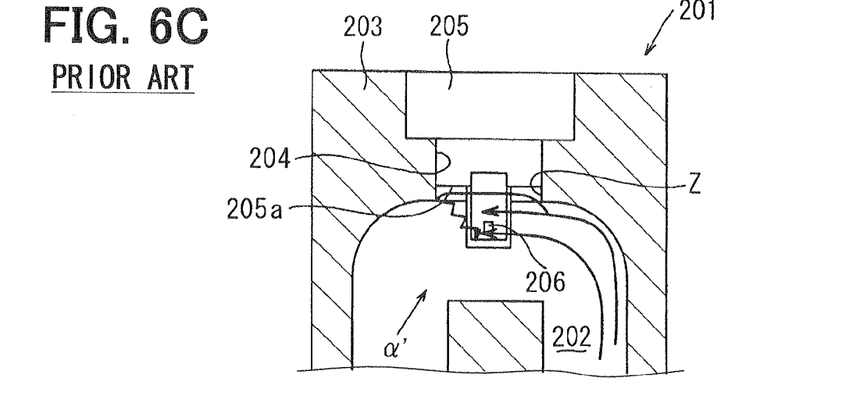
FIG. 6C is a general sectional view illustrating the main part of the air flow measuring device in accordance with the second conventional technology.

The second conventional technology will be described bellow. As shown in FIGS. 6A to 6C, a part of a sensor housing 205 (hereinafter referred to as "an inner wall forming part 205a") sometimes serves as a part of an inner wall of a measured passage 202. In this case as well, as shown in FIG. 6A, if the "gap X" is made between a passage forming housing 203 and the sensor housing 205, turbulence of air flow toward a sensor part 206 is generated (see a devious arrow in FIG. 6A) and causes variation of output from the sensor part 206.

In the case where the inner wall forming part 205a is formed on the sensor housing 205, it is difficult to make "the inner wall of the inner wall forming part 205a (the inner wall of the sensor housing 205)" coplanar with "an inner wall of the passage forming housing 203" with a high degree of accuracy. For this reason, as shown in FIG. 6B, "the inner wall forming part 205a of the sensor housing 205" may project into the measured passage 202, and a "projecting step difference Y" due to the inner wall forming part 205a is possibly formed in the measured passage 202. Alternatively, as shown in FIG. 6C, "the inner wall forming part 205a of the sensor housing 205" may be recessed from the inner wall of the measured passage 202, and a "recessed step difference Z" due to the inner wall forming part 205a is possibly formed in the measured passage 202.

In this way, if the "projecting step difference Y" or the "recessed step difference Z" due to the inner wall forming part 205a is made in the measured passage 202, the turbulence of the air flow toward the sensor part 206 is generated (see devious arrows in FIGS. 6B and 6C) and causes the variation of the output from the sensor part 206. Moreover, depending on the shape (curve) of the measured air on an upstream side of the sensor part 206 in a measured air flow direction, influence of the "projecting step difference Y" or the "recessed step difference Z" increases, and the variation of the output from the sensor part 206 becomes great.

Figure 7A:
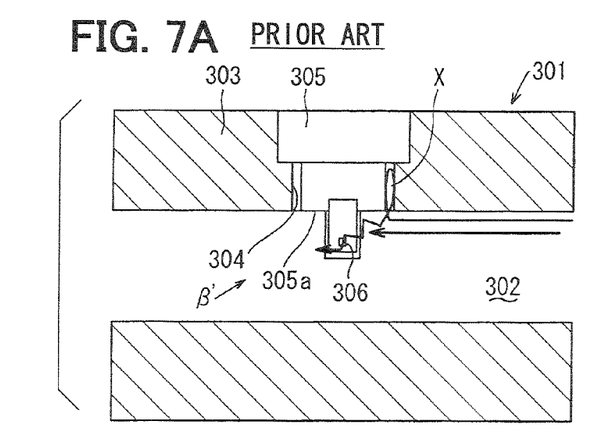
FIG. 7A is a general sectional view illustrating a main part of an air flow measuring device in accordance with a third conventional technology.
Figure 7B:
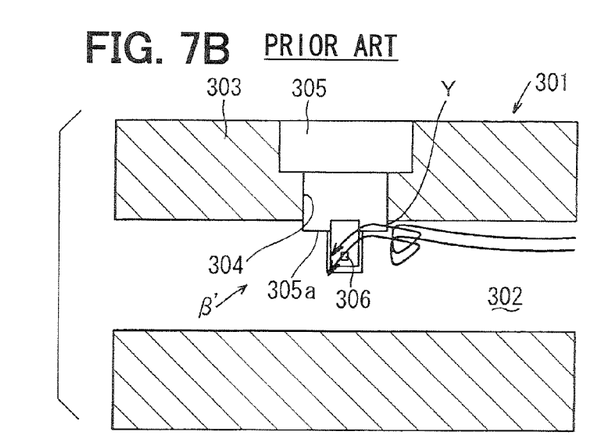
FIG. 7B is a general sectional view illustrating the main part of the air flow measuring device in accordance with the third conventional technology.
Figure 7C:
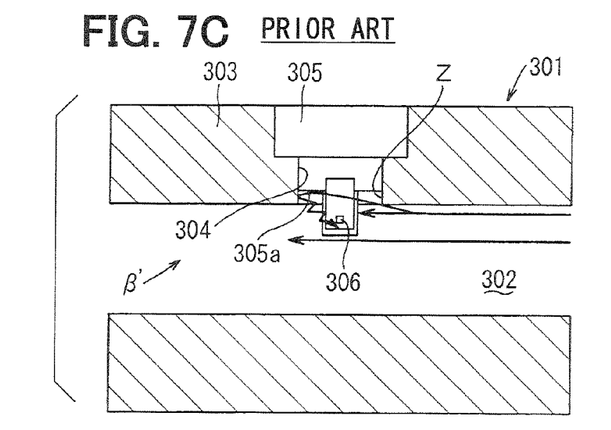
FIG. 7C is a general sectional view illustrating the main part of the air flow measuring device in accordance with the third conventional technology.

The third conventional technology will be described below. In the above, the first and second conventional technologies are described by using FIGS. 5 to 6C in which the sensor housing 105 and 205 are disposed at a curved part α' of the measured passage 102 and 202 respectively. Also in the case where a sensor housing 305 is disposed at a straight part β' of a measured passage 302 as shown in FIGS. 7A to 7C, the "gap X", the "projecting step difference Y", or the "recessed step difference Z" described above causes a similar defect (turbulence of air flow toward a sensor part 306).

SUMMARY OF THE INVENTION

The present invention addresses at least one of the above disadvantages.

According to the present invention, there is provided an air flow measuring device including a passage forming housing, a sensor housing, and a sensor part. An inner wall surface of the passage forming housing defines a measured passage. The passage forming housing includes a sensor attaching part. Measured air flows through the measured passage. The sensor housing is attached to the sensor attaching part. The sensor part is disposed on the sensor housing and is configured to measure a flow rate of the measured air flowing through the measured passage. The passage forming housing further includes a guiding means for guiding the measured air, which flows along the inner wall surface of the passage forming housing on an upstream side of the sensor attaching part in a flow direction of the measured air, further toward a center of the measured passage than the inner wall surface of the passage forming housing on a downstream side of the sensor attaching part in the flow direction.

According to the present invention, there is also provided an air flow measuring device including a passage forming housing, a sensor housing, and a sensor part. An inner wall surface of the passage forming housing defines a measured passage. The passage forming housing includes a sensor attaching part. Measured air flows through the measured passage. The sensor housing is attached to the sensor attaching part. The sensor part is disposed on the sensor housing and is configured to measure a flow rate of the measured air flowing through the measured passage. The inner wall surface of the passage forming housing on an upstream side of the sensor attaching part in a flow direction of the measured air includes a guiding means that projects into the measured passage, so that the measured passage on the upstream side of the sensor attaching part in the flow direction is narrower than the measured passage on a downstream side of the sensor attaching part in the flow direction. The guiding means is for guiding the measured air, which flows along the inner wall surface of the passage forming housing on the upstream side of the sensor attaching part in the flow direction, further toward a center of the measured passage than the inner wall surface of the passage forming housing on the downstream side of the sensor attaching part in the flow direction.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Embodiments will be described bellow in reference to drawings. An air flow measuring device 1 includes a passage forming housing 3 that defines a measured passage 2 in which measured air flows, a sensor housing 5 attached to a sensor attaching part 4 which is formed on the passage forming housing 3, and a sensor part 6 which is disposed on an end of the sensor housing 5 and measures a flow rate of the measured air flowing through the measured passage 2.

The passage forming housing 3 includes a guiding means 7 for guiding the measured air, which flows along an inner wall surface of the measured passage 2 on an upstream side of the sensor attaching part 4 in a flow direction of the measured air, further toward a center of the measured passage 2 than the inner wall surface of the measured passage 2 on a downstream side of the sensor attaching part 4 in the flow direction. The guiding means 7 may (i) be partially formed in the measured passage 2 immediately in front of the sensor attaching part 4 (on an upstream side of the sensor attaching part 4 in the flow direction) or (ii) be formed by making the measured passage 2 on the upstream side of the sensor attaching part 4 narrower than the measured passage 2 on the downstream side of the sensor attaching part 4. In that way, a flow of the measured air toward the sensor part 6 is not affected by influence of a "gap X", a "projecting step difference Y", or a "recessed step difference Z". Thus, output from the sensor part 6 can be stabilized.

It is preferable that a step difference 7a should be formed at a downstream end part of the guiding means 7 in the measured air flow direction. The step difference 7a exfoliates the air flowing along the guiding means 7. The sensor attaching part 4 may be a sensor insertion hole which receives the sensor housing 5 from the outside of the passage forming housing 3 or may be a "sensor attaching recessed part (including a groove)" which is formed on an inner wall of the passage forming housing 3 (inner wall defining the measured passage 2).

First Embodiment

Specific examples (embodiments) applying the invention will be described below in reference to drawings. The embodiments disclose the specific examples and it is needless to say that the invention is not limited to the embodiments.

A first embodiment will be described in reference to FIGS. 1 and 2. An air flow measuring device 1 in accordance with the present embodiment, as shown in FIG. 2, is installed in an air intake duct 10 of an engine for a vehicle, and is an air flow meter (AFM) which measures a flow rate of air suctioned into the engine (intake air amount). The air flow measuring device 1 includes a passage forming housing 3 attached to the air intake duct 10, a sensor housing 5 attached to the passage forming housing 3, and a sensor part 6 provided for the sensor housing 5.

The sensor part 6 is a heating resistor type sensor disposed at an end of the sensor housing 5, and is disposed such that its air flow measurement part is in contact with air. The heating resistor type sensor has a well-known composition. And an example of that will be given below, but it is not limited to this example. The heating resistor type sensor part 6 employs a heat generating resistive element that produces heat upon energization thereof and a thermosensing resistive element whose resistive value varies according to temperature change. The sensor part 6 measures an air flow rate based on variation of a resistance value of the thermosensing resistive element (specifically, based on variation of voltage as a result of the variation of the resistance value of the thermosensing resistive element). For example, the sensor part 6 can be disposed as a sensor module on a chip.

The passage forming housing 3 is, for example, made from resin material, and is attached to the air intake duct 10 guiding intake air into the engine. A secondary air passage 11 and a tertiary air passage 2, through both of which a part of air flowing in the air intake duct 10 (main air passage) passes, are formed in the passage forming housing 3. More specifically, an AFM attachment hole 12 that penetrates through the air intake duct 10 is provided for the air intake duct 10. By inserting and disposing the passage forming housing 3 into the air intake duct 10 from outside of the AFM attachment hole 12, the air flow measuring device 1 is attached to the air intake duct 10.

By attaching the air flow measuring device 1 to the air intake duct 10, an air intake 11a of the passage forming housing 3 is directed toward an upstream side in an intake air flow direction and an air exhaust 11b of the passage forming housing 3 is directed toward a downstream side in the intake air flow direction. The passage forming housing 3 is detachably attached to the air intake duct 10 by using a fastening member (not shown) such as a screw.

The secondary air passage 11 is an air passage through which a part of air flowing in the air intake duct 10 passes, and the passage is formed along the intake air flow direction in the air intake duct 10. The above-described air intake 11a is disposed on an upstream side of the secondary air passage 11 in the intake air flow direction, and the above-described air exhaust 11b is disposed on a downstream side of the secondary air passage 11 in the intake air flow direction. In addition, a narrowed part is formed at the air exhaust 11b in order to narrow an air flow passing thorough the secondary air passage 11.

The tertiary air passage 2 includes an inlet 2a into which a part of air flowing in the secondary air passage 11 narrowed by the narrowed part flows, and an outlet (not shown) which opens on the upstream side of the secondary air passage 11 in the intake air flow direction. The inlet 2a and the outlet constitute a bypass passage along which the air flowing through the inlet 2a rotates by about 360 degrees and returns into the secondary air passage 11 again. The sensor part 6 measures the flow rate of air flowing in the tertiary air passage 2. The tertiary air passage 2 may correspond to a measured passage, and the air flowing in the tertiary air passage 2 may correspond to measured air which is a measuring object.

The sensor housing 5 is made from resin material similar to the passage forming housing 3, and is attached to the passage forming housing 3. A sensor attaching part 4 for attaching the sensor housing 5 is provided for the passage forming housing 3.

Figure 1:
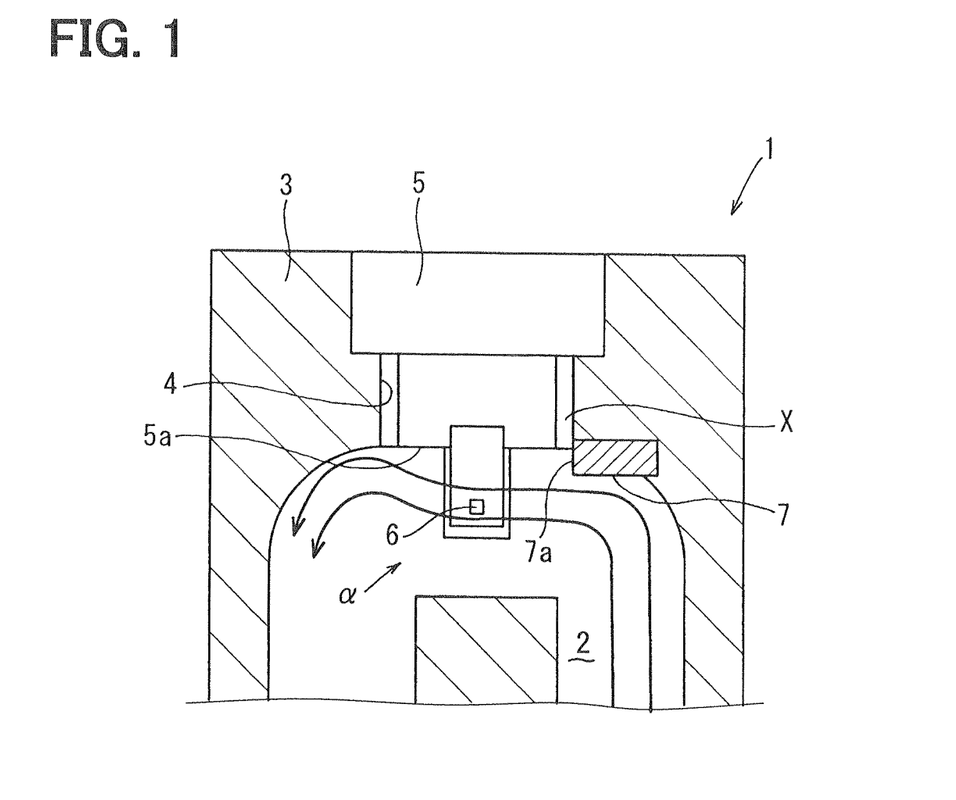
FIG. 1 is a general sectional view illustrating a main part of an air flow measuring device in accordance with a first embodiment of the invention.
Figure 2:
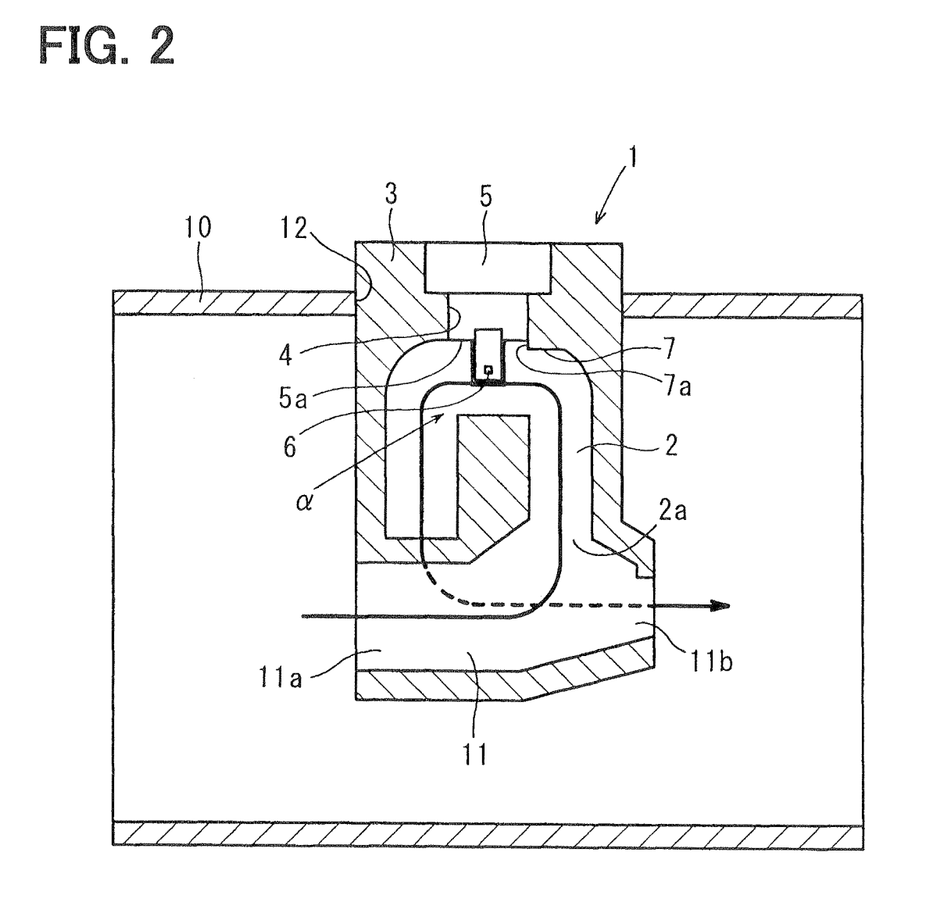
FIG. 2 is a general sectional view illustrating the air flow measuring device in accordance with the first embodiment.

Specifically, the tertiary air passage 2, as described above, constitutes the bypass passage through which the air flowing in the inlet 2a rotates by about 360 degrees and returns into the secondary air passage 11 again, and the passage forming housing 3 defines a curved part (U-turn part) a of the tertiary air passage 2 as illustrated in FIG. 1. The sensor housing 5 is attached to a region of the passage forming housing 3 that defines the curved part α, and the sensor attaching part 4 is provided for the passage forming housing 3 on the outer circumferential side of the curved part α.

In the present embodiment, as an example of the sensor attaching part 4, a sensor insertion hole which receives the sensor housing 5 from the outside of the passage forming housing 3 is disclosed. However, unlike this embodiment, a "sensor attaching recessed part (including a groove)" which is formed on an inner wall of the passage forming housing 3 (inner wall defining the measured passage 2) can also be used as the sensor attaching part 4. By attaching the sensor housing 5 to the sensor attaching part 4, the sensor part 6 provided for the sensor housing 5 is disposed inside the tertiary air passage 2. Accordingly, the sensor part 6 is positioned at the curved part α. In addition, the sensor housing 5 can be bonded to the passage forming housing 3 by applying, for example, an adhesive or an adhesion technology or can be detachably attached by using a fastening member such as a screw.

Furthermore, the sensor housing 5 illustrated in this embodiment includes an inner wall forming part 5a which composes a part of an inner wall of the tertiary air passage 2 as illustrated in FIG. 1.

The sensor housing 5 in this embodiment, as described above, is incorporated into the sensor attaching part 4. Therefore, a "gap X" may be formed between the inner wall forming part 5a and the passage forming housing 3 because of dimensional variation (tolerance) of the passage forming housing 3 and the sensor housing 5. Moreover, because the passage forming housing 3 and the sensor housing 5 have the dimensional variation (tolerance), it is difficult to make "an inner wall of the inner wall forming part 5a" coplanar with "the inner wall of the passage forming housing 3" with a high degree of accuracy. Therefore, due to the projection or depression of "the inner wall forming part 5a" relative to the measured passage 2, a "projecting step difference Y" (see, for example, FIG. 6B) or a "recessed step difference Z" (see, for example, FIG. 6C) is possibly formed.

If at least one of the "gap X", the "projecting step difference Y", and the "recessed step difference Z" described above is made, turbulence of air flow is generated by the "gap X", the "projecting step difference Y", or the "recessed step difference Z". Then, a defect of fluctuation of the output from the sensor part 6 results (see FIGS. 6A to 6C). Particularly, depending on the shape (curve) of the measured air on an upstream side of the sensor part 6 in the measured air flow direction, influence of the "gap X" and "the projecting step difference Y due to the inner wall forming part 5a" is made significant, and variation of the output from the sensor part 6 becomes great.

In order to avoid the above-described defects, a guiding means 7 is provided for the passage forming housing 3 of this embodiment immediately in front of the sensor attaching part 4 (i.e., at an upstream side portion of the sensor attaching part 4 in the measured air flow direction). This guiding means 7 is a bulged part which bulges toward an inner side of the tertiary air passage 2 along an air flow on the upstream side of the sensor part 6 in the measured air flow direction. The guiding means 7 smoothly guides the measured air flowing along the inner wall of the tertiary air passage 2 on the upstream side of the sensor part 6 toward a center of the tertiary air passage 2.

In addition, in FIG. 1, in order to simply indicate the guiding means 7, the guiding means 7 is illustrated as a different component from the passage forming housing 3. However, the actual guiding means 7 is formed as a part of the passage forming housing 3 as shown in FIG. 2. Hence, a defect of increase in a component count by disposing the guiding means 7 does not occur, and a cost rise is not caused even by forming the guiding means 7. Needless to say, the invention is not limited to the device 1 in which the passage forming housing 3 and the guiding means 7 are integrated, and the guiding means 7 and the passage forming housing 3 may be provided separately from each other.

A step difference 7a which exfoliates the measured air flowing along the guiding means 7 is formed at a downstream end part of the guiding means 7 in the measured air flow direction. The step difference 7a is a wall part which is almost perpendicular to the direction of the measured air flow. The step difference 7a exfoliates the measured air flowing along the guiding means 7 at a separated area from a wall surface of the tertiary air passage 2 (on a center side of the air flow through the tertiary air passage 2). The air exfoliated at the step difference 7a, as indicated by arrows in FIG. 1, flows to be attracted toward a direction in which the flow passage expands by the Coanda effect. Then, on a downstream side of the air flow after passing the guiding means 7, the exfoliated air at the step difference 7a is attached on the inner wall surface of the tertiary air passage 2 again, and flows along the inner wall surface of the tertiary air passage 2.

Advantageous effects of the first embodiment will be described below. The air flow measuring device 1 in this embodiment, as described above, includes the guiding means 7 immediately in front of the sensor attaching part 4 (at an upstream side of the sensor attaching part 4 in the flow direction of the measured air). Thus, an air flow (air flowing along the inner wall surface of the tertiary air passage 2) can be guided toward the center of the passage away from the "gap X", the "projecting step difference Y", or the "recessed step difference Z" by the guiding means 7. Then, the air flowing along the guiding means 7 is exfoliated at the step difference 7a to flow over the "gap X", the "projecting step difference Y", or the "recessed step difference Z". The air exfoliated at the step difference 7a is attracted toward the direction in which the flow passage expands by the Coanda effect, and is reattached on and flows along the inner wall surface of the tertiary air passage 2 on the downstream side of the air flow after passing the guiding means 7.

In this way, despite the forming of at least one of the "gap X", the "projecting step difference Y", and the "recessed step difference Z", the air flow is stabilized and the turbulence of the air flow is prevented by the guiding means 7 and the step difference 7a. As a result, the variation of the output from the sensor part 6 is limited and the output from the sensor part 6 is stabilized. For this reason, accuracy in flow measurement by the air flow measurement device 1 can be improved and reliability of the air flow measurement device 1 can be enhanced.

Second Embodiment

A second embodiment of the invention will be described in reference to

Figure 3:
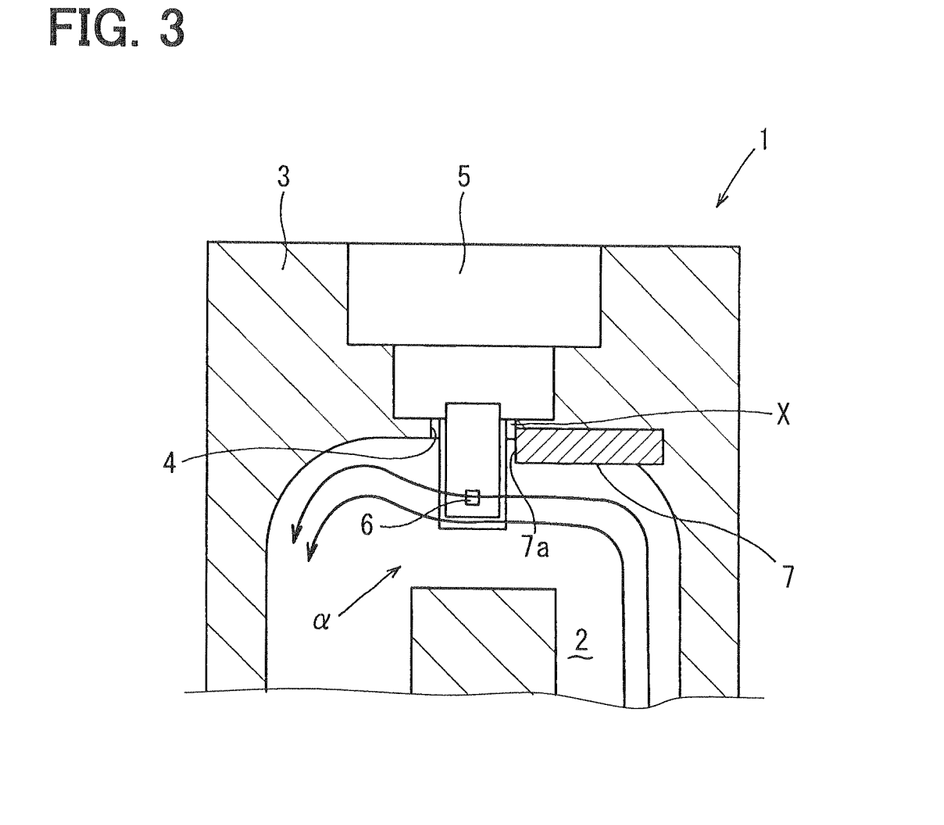
FIG. 3 is a general sectional view illustrating a main part of an air flow measuring device in accordance with a second embodiment of the invention.

FIG. 3. In the following embodiments, the same numeral as used in the above embodiment indicates the corresponding functional material. In the above first embodiment, the inner wall forming part 5a is formed on the sensor housing 5 as a part of the inner wall of the tertiary air passage 2. In contrast to this, a sensor housing 5 of the second embodiment dose not include an inner wall forming part 5a (for its numeral, see the first embodiment) as shown in FIG. 3. As well, in this case in which the inner wall forming part 5a is not formed on the sensor housing 5, a "gap X" may be caused due to dimensional variation (tolerance) of a passage forming housing 3 and the sensor housing 5.

For this reason, even in the case where the inner wall forming part 5a is not formed on the sensor housing 5 as illustrated in the second embodiment, by disposing the guiding means 7 and the step difference 7a illustrated in the first embodiment, turbulence of an air flow generated by the "gap X" can be prevented. Therefore, output variation from a sensor part 6 is prevented and output from the sensor part 6 is stabilized. For this reason, as is the case with the first embodiment, accuracy in flow measurement by an air flow measurement device 1 can be improved and reliability of the air flow measurement device 1 can be enhanced.

Third Embodiment

A third embodiment of the invention will be described in reference to FIGS. 4A to 4D. In the above first embodiment, the sensor part 6 is disposed at the curved part α in which the measured air flows in a curved manner. In contrast to this, in the third embodiment, a sensor part 6 is disposed at a straight part β in which measured air flows straight.

Specifically, a passage forming housing 3 in the third embodiment defines the straight part β of a measured passage 2. As shown in FIGS. 4A to 4D, a sensor housing 5 is attached to a region of the passage forming housing 3 that defines the straight part β. The sensor part 6 is disposed at the straight part β. In addition, a guiding means 7, as described above, guides an air flow smoothly toward a center of the passage 2. Concrete examples of the guiding means 7 for guiding the air flow toward a center of the passage 2 are illustrated in FIGS. 4A to 4D.

Figure 4A:
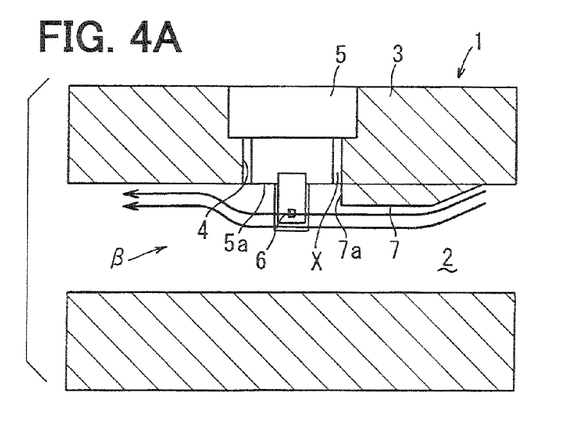
FIG. 4A is a general sectional view illustrating a main part of an air flow measuring device in accordance with a third embodiment of the invention.
Figure 4B:
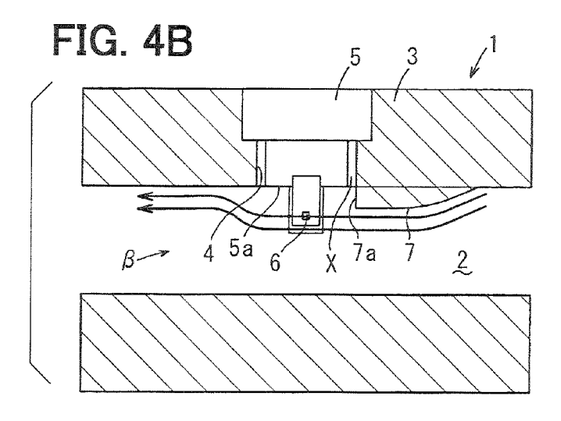
FIG. 4B is a general sectional view illustrating the main part of the air flow measuring device in accordance with the third embodiment.
Figure 4C:
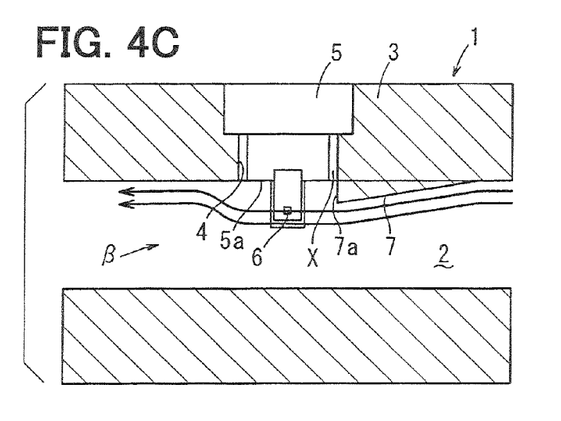
FIG. 4C is a general sectional view illustrating the main part of the air flow measuring device in accordance with the third embodiment.
Figure 4D:
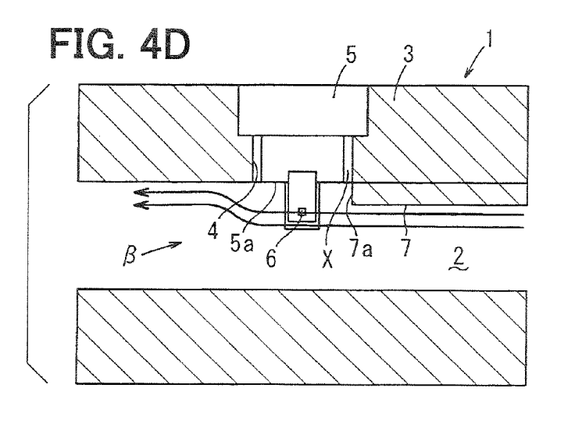
FIG. 4D is a general sectional view illustrating the main part of the air flow measuring device in accordance with the third embodiment.

FIGS. 4A to 4D show the examples in which the guiding means 7 is partially formed in the measured passage 2 immediately in front of a sensor attaching part 4 (on an upstream side of the sensor attaching part 4 in a flow direction of the measured air). The guiding means 7 is composed of a flat surface and an inclined surface in FIG. 4A, the guiding means 7 is composed of an inclined curved surface in FIG. 4B, the guiding means 7 is composed of a straight inclined surface in FIG. 4C. In FIG. 4D, the guiding means 7 is formed on an upstream side of the sensor attaching part 4 in the flow direction of the measured air by making the measured passage 2 on the upstream side of the sensor attaching part 4 narrower than the measured passage 2 on a downstream side of the sensor attaching part 4. Needless to say, the technologies illustrated in FIGS. 4A to 4D may be applied to the first embodiment.

In this way, in an air flow measuring device 1 in which the sensor part 6 is disposed at the straight part 3, by forming the guiding means 7 and a step difference 7a, the effects similar to the first embodiment can be produced. Thus, even if at least one of a "gap X", a "projecting step difference Y", and a "recessed step difference Z" is caused, the air flow is stabilized and turbulence of the air flow is prevented by the guiding means 7 including the step difference 7a. Accordingly, output from the sensor part 6 is stabilized. As a result, accuracy in flow measurement by the air flow measurement device 1 can be improved and reliability of the air flow measurement device 1 can be enhanced.

In the embodiments described above, the invention is applied to the air flow measurement device 1 in which two air passages (i.e., the secondary air passage 11 and the tertiary air passage 2) are formed inside the passage forming housing 3. However, the invention may be applied to an air flow measurement device 1 in which only one air passage (i.e., the measured passage 2) is formed inside the passage forming housing 3.

In the embodiments described above, the flow direction of the measured air flowing through the sensor part 6 is opposite to an air flow direction in the air intake duct 10. However, the flow direction of the measured air flowing through the sensor part 6 is not limited to a fixed direction. For example, a forward direction which is along the air flow direction in the air intake duct 10, or a direction which is perpendicular to the air flow direction in the air intake duct 10, may be the flow direction of the measured air through the sensor part 6.

In the embodiments described above, the heating resistor type sensor is used as one example of the sensor part 6, but an air flow sensor is not limited to the heating resistor type sensor, and may adopt another type of a flow measurement method.

In the embodiments described above, the invention is applied to the air flow measurement device 1 which measures the intake air amount of the engine of the vehicle. However, use of the invention is not limited to the air flow measurement device 1, and the invention may be used for an air flow measurement device 1 designed for another purpose.

To sum up, the air flow measuring device 1 in accordance with the above embodiments may be described as follows.

In the air flow measuring device 1 in accordance with the above embodiments, the sensor housing 5 is incorporated into the sensor attaching part 4 which is formed on the passage forming housing 3. Thus, the "gap X" may be formed between the inner wall forming part 5a and the passage forming housing 3. Because the guiding means 7 is provided for the upstream side portion of the sensor attaching part 4 formed on the passage forming housing 3 in the flow direction of the measured air, the measured air which flows along the inner wall surface of the measured passage 2 is guided toward the center of the measured passage 2 (separated area from the "gap X"). Therefore, despite the forming of the "gap X" between the passage forming housing 3 and the sensor housing 5, the measured air can flow over the "gap X" by the guiding means 7. Then, the measured air can flow stably without the turbulence by the guiding means 7. As a result, the variation of the output from the sensor part 6 is limited and the output from the sensor part 6 is stabilized.

In the air flow measuring device 1 in accordance with the above embodiments, at the downstream end part of the guiding means 7 in the flow direction of the measured air, the step difference 7a which exfoliates the air flowing along the guiding means 7 is formed. The air flowing along the guiding means 7 exfoliates from the step difference 7a and flows over the "gap X". Then, the air exfoliated at the step difference 7a is attracted toward the direction in which the flow passage expands by the Coanda effect, and is reattached on and flows along the inner wall surface of the measured passage 2, on the downstream side of the air flow after passing the guiding means 7.

In the air flow measuring device 1 in accordance with the first and third embodiments, the sensor housing 5 includes the inner wall forming part 5a which composes a part of the inner wall of the measured passage 2. For this reason, the "projecting step difference Y" or the "recessed step difference Z" may be formed on the inner wall of the measured passage 2 by the inner wall forming part 5a. As described above, because the guiding means 7 is provided for the upstream side portion of the sensor attaching part 4 formed on the passage forming housing 3 in the flow direction of the measured air, the measured air which flows along the inner wall surface of the measured passage 2 is guided toward the center of the measured passage 2 (separated area from the "projecting step difference Y" or the "recessed step difference Z"), and the air flowing along the guiding means 7 flows over the "projecting step difference Y" or the "recessed step difference Z". In this way, despite the forming of the "projecting step difference Y" or the "recessed step difference Z" on the inner wall of the measured passage 2 by the inner wall forming part 5a, the measured air can flow stably and the output from the sensor part 6 can be stabilized.

The air flow measuring device 1 as illustrated in FIG. 2 is a specific example of the passage forming housing 3. The passage forming housing 3 is attached to the air intake duct 10 guiding the intake air into the engine (e.g., the engine for the vehicle or air conditioning of a bus). The passage forming housing 3 includes the secondary air passage 11 through which a part of air flowing in the air intake duct 10 flows and the tertiary air passage 2 through which a part of air flowing in the secondary air passage 11 flows. The tertiary air passage 2 corresponds to the measured passage 2 and the air flowing in the tertiary air passage 2 corresponds to the measured air. Accordingly, the output from the sensor part 6 located in the tertiary air passage 2 (measured passage 2) is stabilized by the invention. As a result, the flow rate of the intake air into the engine can be measured with a high degree of accuracy.

The sensor part 6 is the heating resistor type sensor as a specific example. Therefore, the output from the heating resistor type sensor part 6 is stabilized by the invention. As a result, the flow rate of the intake air can be measured with a high degree of accuracy by the heating resistor type sensor part 6.

The air flow measuring device 1 in accordance with the first embodiment is a specific example of the region to which the sensor housing 5 is attached. The passage forming housing 3 defines the curved part $\alpha$ of the measured passage 2. The sensor housing 5 is attached to the region of the passage forming housing 3 that defines the curved part $\alpha$ such that the sensor part 6 is located in the curved part $\alpha$. In this way, in the air flow measuring device 1 in which the sensor housing 5 is attached to the region of the passage forming housing 3 that defines the curved part $\alpha$, the output from the sensor part 6 located in the curved part $\alpha$ can be stabilized by the invention.

The air flow measuring device 1 in accordance with the third embodiment is a specific example of the region to which the sensor housing 5 is attached. The passage forming housing 3 defines the straight part $\beta$ of the measured passage 2. The sensor housing 5 is attached to the region of the passage forming housing 3 that defines the straight part $\beta$ such that the sensor part 6 is located in the straight part $\beta$. In this way, in the air flow measuring device 1 in which the sensor housing 5 is attached to the region of the passage forming housing 3 that defines the straight part $\beta$, the output from the sensor part 6 located in the straight part $\beta$ can be stabilized by the invention.

Additional advantages and modifications will readily occur to those skilled in the art. The invention in its broader terms is therefore not limited to the specific details, representative apparatus, and illustrative examples shown and described.

What is claimed is:

1. An air flow measuring device comprising:
a passage forming housing, an inner wall surface of which defines a measured passage and which includes a sensor attaching part, wherein measured air flows through the measured passage;
a sensor housing that is attached to the sensor attaching part;
a gap provided between the sensor attaching part and the sensor housing; and
a sensor part that is disposed on the sensor housing and is configured to measure a flow rate of the measured air flowing through the measured passage, wherein:
the passage forming housing further includes a guiding member guiding the measured air, which flows along the inner wall surface of the passage forming housing on an upstream side of the sensor attaching part in a flow direction of the measured air, further toward a center of the measured passage than the inner wall surface of the passage forming housing on a downstream side of the sensor attaching part in the flow direction;
the guiding member is provided on the upstream side of the sensor attaching part in the flow direction of the measured air; and
the guiding member is adjacent to the gap and is located upstream of the gap in the flow direction of the measured air.

2. The air flow measuring device according to claim 1, wherein:
the guiding member includes a step difference at an end portion of the guiding member on a downstream side thereof in the flow direction; and
the measured air, which has flowed along the guiding member, exfoliates at the step difference.

3. The air flow measuring device according to claim 1, wherein the sensor housing includes an inner wall forming part that constitutes the inner wall surface of the passage forming housing.

4. The air flow measuring device according to claim 1, wherein:
the passage forming housing is adapted to be attached to an air intake duct that guides intake air to an engine, and further includes:
a secondary air passage through which a part of air flowing in the air intake duct flows; and
a tertiary air passage through which a part of air flowing in the secondary air passage flows;
the tertiary air passage corresponds to the measured passage; and
air flowing in the tertiary air passage corresponds to the measured air.

5. The air flow measuring device according to claim 1, wherein the sensor part is of a heating resistor type.

6. The air flow measuring device according to claim 1, wherein:
the passage forming housing defines a curved part of the measured passage; and
the sensor housing is attached to a region of the passage forming housing that defines the curved part such that the sensor part is located in the curved part.

7. The air flow measuring device according to claim 1, wherein:
the passage forming housing defines a straight part of the measured passage; and
the sensor housing is attached to a region of the passage forming housing that defines the straight part such that the sensor part is located in the straight part.

8. An air flow measuring device comprising:
a passage forming housing, an inner wall surface of which defines a measured passage and which includes a sensor attaching part, wherein measured air flows through the measured passage;
a sensor housing that is attached to the sensor attaching part;
a gap provided between the sensor attaching part and the sensor housing; and
a sensor part that is disposed on the sensor housing and is configured to measure a flow rate of the measured air flowing through the measured passage, wherein:
the inner wall surface of the passage forming housing on an upstream side of the sensor attaching part in a flow direction of the measured air includes a guiding member that projects into the measured passage, so that the measured passage on the upstream side of the sensor attaching part in the flow direction is narrower than the measured passage on a downstream side of the sensor attaching part in the flow direction; and
the guiding member guides the measured air, which flows along the inner wall surface of the passage forming housing on the upstream side of the sensor attaching part in the flow direction, further toward a center of the measured passage than the inner wall surface of the passage forming housing on the downstream side of the sensor attaching part in the flow direction.

9. The air flow measuring device according to claim 8, wherein:
the guiding member includes a step difference at an end portion of the guiding member on a downstream side thereof in the flow direction; and
the measured air, which has flowed along the guiding member, exfoliates at the step difference.

10. The air flow measuring device according to claim 8, wherein the sensor housing includes an inner wall forming part that constitutes the inner wall surface of the passage forming housing.

11. The air flow measuring device according to claim 8, wherein:
the passage forming housing is adapted to be attached to an air intake duct that guides intake air to an engine, and further includes:
a secondary air passage through which a part of air flowing in the air intake duct flows; and
a tertiary air passage through which a part of air flowing in the secondary air passage flows;
the tertiary air passage corresponds to the measured passage; and
air flowing in the tertiary air passage corresponds to the measured air.

12. The air flow measuring device according to claim 8, wherein the sensor part is of a heating resistor type.

13. The air flow measuring device according to claim 8, wherein:
the passage forming housing defines a curved part of the measured passage; and
the sensor housing is attached to a region of the passage forming housing that defines the curved part such that the sensor part is located in the curved part.

14. The air flow measuring device according to claim 8, wherein:
the passage forming housing defines a straight part of the measured passage; and
the sensor housing is attached to a region of the passage forming housing that defines the straight part such that the sensor part is located in the straight part.

15. An air flow measuring device comprising:
a passage forming housing, an inner wall surface of which defines a measured passage and which includes a sensor attaching part, wherein measured air flows through the measured passage;
a sensor housing that is attached to the sensor attaching part; and
a sensor part that is disposed on the sensor housing and is configured to measure a flow rate of the measured air flowing through the measured passage, wherein:
the passage forming housing further includes a guiding member guiding the measured air, which flows along the inner wall surface of the passage forming housing on an upstream side of the sensor attaching part in a flow direction of the measured air, further toward a center of the measured passage than the inner wall surface of the passage forming housing on a downstream side of the sensor attaching part in the flow direction;
the guiding member is adjacent to the sensor attaching part and is located on the upstream side of the sensor attaching part in the flow direction of the measured air; and
the guiding member protrudes from the inner wall surface of the passage forming housing into the measured passage.

16. The air flow measuring device according to claim 15, wherein a downstream end of the guiding member in the flow direction is higher in height from the inner wall surface than an upstream end of the guiding member in the flow direction.

17. The air flow measuring device according to claim 15, wherein the measured passage on the upstream side of the sensor attaching part in the flow direction is narrower than the measured passage on a downstream side of the sensor attaching part in the flow direction.

18. The air flow measuring device according to claim 15, wherein the sensor housing includes an inner wall forming part that constitutes the inner wall surface of the passage forming housing.

19. The air flow measuring device according to claim 15, wherein:
- the passage forming housing is adapted to be attached to an air intake duct that guides intake air to an engine, and further includes:
- a secondary air passage through which a part of air flowing in the air intake duct flows; and
- a tertiary air passage through which a part of air flowing in the secondary air passage flows;
- the tertiary air passage corresponds to the measured passage; and
- air flowing in the tertiary air passage corresponds to the measured air.

20. The air flow measuring device according to claim 15, wherein the sensor part is of a heating resistor type.

* * * * *